United States Patent [19]

Bickford et al.

[11] 3,821,646

[45] June 28, 1974

[54] SCATTER COMMUNICATION SYSTEM

[75] Inventors: William J. Bickford, Weston; Howard J. Rowland, Newton Highlands; Carson K. H. Tsao, Braintree, all of Mass.

[73] Assignee: Raytheon Company, Lexington, Mass.

[22] Filed: Feb. 25, 1972

[21] Appl. No.: 229,577

Related U.S. Application Data

[63] Continuation of Ser. No. 812,807, April 2, 1969, abandoned.

[52] U.S. Cl. ........................ 325/56, 325/59, 325/65, 343/100 CS

[51] Int. Cl. ............................................ H04b 7/02

[58] Field of Search ......... 325/56, 63, 65, 156, 157, 325/180, 59; 343/100 CS, 100 SA

[56] References Cited

UNITED STATES PATENTS

| | | | |
|---|---|---|---|
| 3,160,813 | 12/1964 | Biggi et al. | 325/56 |
| 3,465,337 | 9/1969 | Tanaka et al. | 343/100 SA |
| 3,471,788 | 10/1969 | Bickford et al. | 325/476 |

*Primary Examiner*—Benedict V. Safourek
*Assistant Examiner*—Marc E. Bookbinder
*Attorney, Agent, or Firm*—Joseph D. Pannone; Harold A. Murphy

[57] ABSTRACT

A scatter communication system which utilizes a scattering medium whose time variations of index of refraction within the medium are random and slow compared to the characteristic times of the radiation and the propagation time. The system is designed to provide a means of eliminating the deep fading from the mean value of signal strength encountered in a tropospheric and ionospheric scatter communication systems. By very rapidly scanning the transmitting antenna beam at a rate at least equal to twice the highest information frequency on the carrier, short term fading on the order of less than one minute is eliminated.

2 Claims, 2 Drawing Figures

PATENTED JUN 28 1974 3,821,646

INVENTORS
WILLIAM J. BICKFORD
HOWARD J. ROWLAND
CARSON K. H. TSAO

BY Irving S. Rappaport
ATTORNEY

SCATTER COMMUNICATION SYSTEM

This is a continuation of application Ser. No. 812,807 filed Apr. 2, 1969, now abandoned.

BACKGROUND OF THE INVENTION

In many scatter communication systems, the scattering medium has time variations of index of refraction within the medium which are random and slow compared to the characteristic times of the radiation $1/f$ and the propagation time (*path length/c*). These problems occur in tropospheric scatter, ionospheric scatter, and in line of site systems due to atmospheric inversions. Rain or fog insofar as they are used as a scattering volume rather than an absorbing medium is also involved.

The purpose of this invention is to provide a means and method of eliminating the deep fading from the mean value of signal strength encountered in the aforementioned communication systems. In particular it is aimed at eliminating the short term fading, ($f < 1$ minute), rather than the long term variety, ($f > 1$ minute).

SUMMARY OF THE INVENTION

The above objects and advantages of the present invention, as well as others, are achieved by providing a scatter communication system in which the effects of short term fading are reduced, the system comprising a transmitting unit which rapidly scans a transmitted beam at a rate at least equal to twice the highest information frequency on a carrier signal; a receiving unit including means for receiving the signal, scan control means for selecting a single element of the signal, means for generating a tone representing the phase of the selected signal element, means for filtering out the tone representing the selected signal element, synthetic phase isolating means for beating the tone with the signal element, and rf filter means matched to the information rate to apply the signal to demodulating means.

DESCRIPTION OF THE PREFERRED EMBODIMENTS

Figures 1, 2:
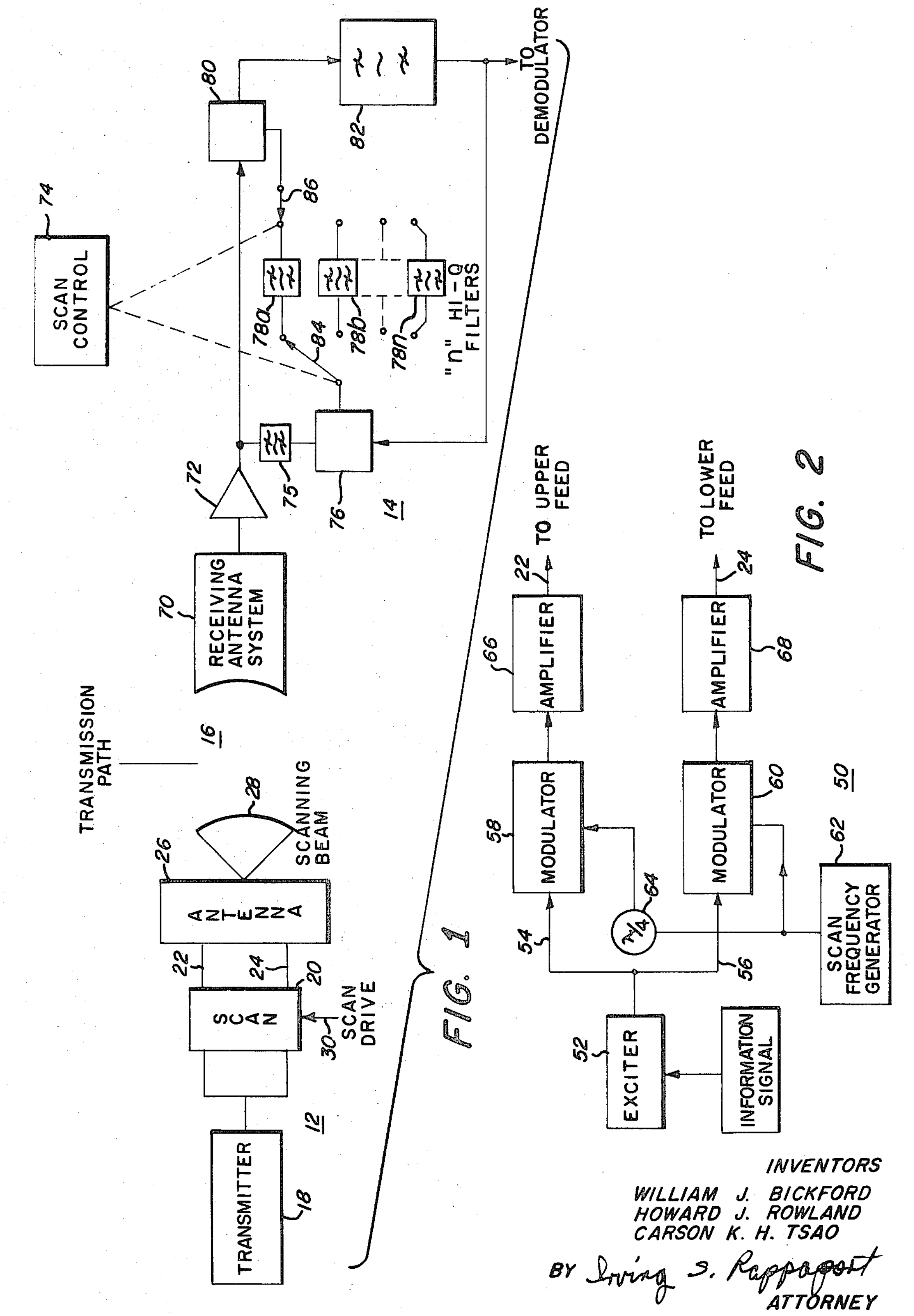
FIG. 1 is a block diagram of the communication system of the present invention.
FIG. 2 is a block diagram of a portion of the transmitting unit shown in FIG. 1.

In understanding the present invention, the principle of operation of a scatterer should be considered. As a model of scatterer, a piece of ground glass may be employed. The glass can show the instantaneous distribution of power caused by the scatterer interacting with a transmitting beam. If a receiving antenna is located somewhere distant from the transmitter, the receiver might or might not be within the power distribution pattern of the scatter depending on its position. As the receiver is moved from one position to another, the received signal strength would have large fluctuations. If the ground glass or scatterer were moved slowly or the transmitting beam was moved in the proper manner, the same results could be achieved. In actual practice, the natural scatterers such as the troposphere and ionosphere are continually in motion and therefore cause similar large fluctuations in the receiving antenna. If the energy arriving at the antenna over a long period (say a minute) is averaged, then except for very long term effects, the received energy would be quite constant over many long periods. It is evident that the faster the scatterer can sweep the high signal strength or create new signal strength at the receiver, the shorter the averaging time need be for constant signal (no fading). Therefore, with a 1 MHz modulation on our carrier, the scatterer or transmitting beam should move at least if not greater than $2X\ 10^6$ times/sec in order to achieve a good average signal strength. Therefore, if the transmitting antenna beam (about one or two beamwidths) can be scanned at a rate at least equal to twice the highest information frequency on the carrier, non-fading scatter communications is achieved. Since in many cases the fade margin is about 20 db., this means a system can operate with the same performance with 20 db. less power or with greater reliability with the same power. There is also the possibility of scanning the receiving antenna.

FIG. 1 shows a scatter communication system 10 which includes a transmitting unit 12, a receiving unit 14 and a transmission path 16 between them. The transmission path 16 may be a tropospheric or ionospheric scatterer or even a line of site system with atmospheric inversions. The transmitting unit 12 includes a transmitter 18 whose output is connected to a scanning unit 20 which has an upper feed 22 and a lower feed 24. The upper and lower feeds 22 and 24 of the scanning unit 20 drive a transmitting antenna 26 which provides a very rapid scanning beam (shown at 38) over the scatter volume with the anticipation that a large number of independent paths will be excited. The scanning unit 20 is driven from a scan driving signal provided at 30.

The signal for driving the scanning unit 20 will now be described in conjunction with FIG. 2. In many scatter communications systems, parabolic dishes are used for transmission. If the phase center of the feed is on the center line of the parabola, the beam will point along the axis of the dish. If the phase center is moved away from the center line, the beam will move in the opposite direction. For example, if the phase center is moved below the axis, the beam will point in an upward direction while if the phase center is moved above the axis, the beam will point in a downward direction. If two feeds are used, (an upper feed and a lower feed), then when the power is all in the upper feed, the beam points down; when the power is all in the lower feed, the beam points up; and when the power is equally divided, the beam is on the center axis.

By way of example, FIG. 2 shows a variable power divider 50 which permits rapid scanning at a desired rate ($>1$ MHz). The information signal is put on a carrier at a low level by an exciter 52, an example of which is described in the Dept. of the Army Technical Manual TM 11-5820-568-12 for maintenance of the Radio Set AN/GRC-147, August 1968, page 3-4. Out of the exciter 52 the power is equally split into two branches 54 and 56. Each branch 54 and 56 is fed into an amplitude modulator 58 and 60 respectively. The carriers are then modulated at the desired scan rate by a scan frequency generator 62 and a phase difference of 180° is introduced in the modulator 58 by a phase shifter ½ λ numbered 64. The scan generator need not be limited to a sine or square wave generator. The output from each of the modulators is then fed to amplifiers 66 and 68 respectively which raise the power to the desired level. Then as a function of time, the two feeds 22 and 24 go through the desired power cycle as previously described resulting in an up scan and a down scan at the modulation rate. Since there is no mechanical inertia to overcome, the scanning can be done as fast as the carrier can be modulated by electrical means.

An alternative antenna system is one where the parabolic dish and its feed system are replaced by the two element phased array. The amplitude modulators 58 and 60 would then be replaced by phase modulators.

The receiving unit 14 of the system 10 shown in FIG. 1 includes a receiving antenna 70 which receives time sequential signals from the postulated paths and whose output is fed through an amplifier 72. Due to the rapid scanning, successive portions of the transmitted signal propagate via different paths resulting in a sequence of these portions which are incident sequentially upon the receiving antenna 70. Each element of the sequence has its associated carrier phase. The phase differences are to be removed. Under direction of a scan control element 74, a commutation function (or switch) sends one element of the sequence to a multiplier filter combination made up of a carrier mixer 76, a plurality of n high Q filters 78 *a–n* for the *n* time sequential signals and a phase isolator mixer 80. In the manner of the synthetic phase isolation technique, described in copending U.S. Pat. No. 3,471,788, filed July 1, 1966 by William J. Bickford, et al. entitled "Predetection Signal Combining System", the carrier phase is contained in the signal out of the selected filter 78. A tone from the selected filter 78 *a– n* results from beating or multiplying the signal element from the amplifier 72 but delayed through delay 75 with the filtered signal from filter 82. The delay through delay 75 equals the delay through mixer 80 and filter 82 with the result that signals arrive in time coincidence at mixer 76. This tone with the carrier phase of the signal element beats with the signal element in the phase isolator mixer 80. The output from the mixer 80 which is applied to the rf receiver filter 82 and which is matched to the information rate, is of arbitrary phase, but all elements have this same phase. The control signal from scan control element 74 may be derived by AM detecting the IF to synchronize a waveform generator, beating the phase isolated filtered signal against the sequence before isolation to provide information at the scan rate or by sending a subharmonic signal via the normal information channel. The scan control element 74 activates a switch 84 connected to the carrier mixer 76 and a switch 86 connected to the mixer 80 in order that the appropriate filter 78 *a–n* is selected so that the selected tone is properly filtered from the signal coming from the carrier mixer 76.

The transmitting antenna 26 beam is scanned rapidly with the scanning period $T_s$, i.e., the scanning frequency is higher than the information bandwidth of interest and much higher than the fading rate of the multipath channel. The scanning period (or interval) $T_s$ may be divided into *n* time increments $t_i$ ($i = 1, \ldots, n$). During each increment the antenna 26 beam is at an angle, $\theta_i$, such that a volume, $V_i$, of scatterers is illuminated. Over the sequence of time intervals from $t_l$ to $t_n$ the volumes successively illuminated range from $V_l$ to $V_n$ corresponding to antenna angles $\theta_l$ to $\theta_n$.

For simplicity, the receiving antenna 70 is assumed stationary, i.e., no scanning. As far as the receiving antenna 70 is concerned, the scatterer volumes $V_i$'s are extended sources. If the time interval under consideration is shorter than the period of fading, the medium is effectively time-invariant. Then the $V_i$'s give rise to received signal levels $e_i$'s, $i = 1, 2, \ldots, n$. $e_i$ is the steady-state signal if the antenna beam is left pointed in direction $\theta_l$. Since the antenna beam 26, due to scanning, dwells at angle $\theta_l$ for only time $t_i$, the signal due to scatterer volume $V_i$ is $$e_i \, m_i \qquad 1.$$

where $m_i$ is the multiplying factor contributed by the scanning action. That is, $m_i$ may be regarded as the amplitude modulation for the extended source confined in volume $V_i$. Since the scatterers are stationary, $m_i$ is a real function.

The $e_i$'s form a set of random variables. If it is assumed that the $V_i$'s are non-overlapping spaces, each containing a large number of scatterers, the contributions from a volume $V_i$ will result in a signal $e_i$ whose elements have a random phase distribution. For $V_i$'s non-overlapping, $e_i$'s are uncorrelated. Thus, over time $T_s$, we have n samples of $e_i$'s. These n samples, for large values of *n*, have the same statistics as any one of the $e_i$ over a long period of time. That is to say that for large *n*, the received signal will exhibit rapid fading over an interval $T_s$. The signal envelope, although varying rapidly, will be repetitive from one scan to another owing to the stationary nature of the scatterers over many scanning intervals. Although the signal fading rate is arbitrarily increased by virtue of rapid scanning of the antenna 26, the mean received power remains the same for each scanning interval. Over a long time interval, the statistical distribution of the scatterers will change and so will the details of the fading envelope during each scan but the repetitiveness and the constant mean power characteristics will persist.

Therefore, if the information in the form of binary data is transmitted at a rate slower than the scanning rate, each bit will have a time interval which is longer than the scanning interval. Hence, although during a bit interval, there will be instances of deep fading, the average power over this interval will not suffer from fading.

Referring to Eq. (1), each $e_i$ is amplitude modulated by $m_i$. This latter introduces sidebands at frequencies $1/Ts$ from the carrier frequency of $e_i$. In the receiver 14, the sidebands are rejected without degrading the information bearing sidebands. It has been assumed that the scatterer volumes $V_i$'s are non-overlapping. In practice, $V_i$'s can be so regarded if the $V_i$'s are bound by one antenna beamwidth. Thus, to have successive $V_i$'s uncorrelated, the successive antenna beam positions must be exactly one beamwidth apart or partial correlation will result. One obvious implication is that for successful scanning applications, the scanning must be over an angle many times the antenna beamwidth.

For a limited scanning angle, the average power over one scanning period may not be the same as the long term mean signal power. Then the sought after improvement in fade margin will not be fully realized. In this regard, the number of beamwidths over which scanning takes place is similar to the number of branches in a diversity system. The total scanning angle is limited by consideration of the scattering angle and the multipath delay spread.

The present invention has been described in the concept of a single transmitting and receiving system. However, it should be understood that the invention may also be used in multi-antenna systems thus providing N times greater diversity.

We claim:

1. A scatter communication system comprising:

a transmitter including a scanned antenna for transmitting a signal, individual portions of said transmitted signal being scanned by said antenna in different directions to traverse a different transmission path for each of said portions and wherein said scanning rate is at least equal to twice the highest information frequency on said transmitted signal;

a receiver including an antenna for receiving the portions of said transmitted signal, each of said transmission paths beginning at said transmitter and terminating at said receiver;

scan control means coupled to said transmitter for altering said transmission paths for sequential ones of said portions of said transmitted signal;

means coupled to said receiver for generating a plurality of tones each of which is representative of the phase of a corresponding individual portion of said received signal;

means for beating said plurality of generated tones with their corresponding individual signal portions; and filter means coupled to said beating means, the bandwidth of said filter means being matched to the information rate of said transmitted signal for reconstructing said transmitted signal.

2. A method for eliminating the effects of short term fading from the mean value of a signal in scatter communication systems, said method comprising the steps of:

transmitting a beam of said signal;

rapidly scanning said transmitted beam of said signal at a rate equal to at least twice the highest information frequency of said signal to transmit portions of said signal over different paths;

receiving the transmitted signal portions;

sequentially selecting said received portions of said transmitted signal;

generating a plurality of tones representing the corresponding phases of said selected signal portions;

beating individual ones of said tones with corresponding ones of said received signal portions to provide a resultant signal; and filtering the resultant signal.

* * * * *